United States Patent
Rofen

[19]

[11] Patent Number: 5,988,109
[45] Date of Patent: Nov. 23, 1999

[54] AQUARIUM WALL CLEANING APPARATUS

[75] Inventor: Robert R. Rofen, Hayward, Calif.

[73] Assignee: Novalek, Inc., Hayward, Calif.

[21] Appl. No.: 09/313,323

[22] Filed: May 17, 1999

[51] Int. Cl.$^6$ .............................. A01K 63/04; A47L 1/08
[52] U.S. Cl. ......................................... 119/245; 15/220.2
[58] Field of Search .................................. 119/245, 264, 119/269; 15/220.2, 250.28, 250.11, 245, 210.1, 219, 218, 103

[56] References Cited

U.S. PATENT DOCUMENTS

| | | | |
|---|---|---|---|
| 3,208,090 | 9/1965 | Roesel, Jr. . | |
| 4,040,864 | 8/1977 | Steeves | 134/6 |
| 4,087,286 | 5/1978 | Sexton et al. | 134/167 R |
| 4,312,296 | 1/1982 | Stelleman et al. | 119/3 |
| 4,380,213 | 4/1983 | Blair et al. | 119/3 |
| 4,921,614 | 5/1990 | Frickman et al. . | |
| 5,264,122 | 11/1993 | Lakotish | 210/169 |
| 5,515,570 | 5/1996 | Muscroft . | |
| 5,845,602 | 12/1998 | Kaarstad et al. | 119/223 |

*Primary Examiner*—Thomas Price
*Attorney, Agent, or Firm*—Harris Zimmerman

[57] ABSTRACT

An apparatus for cleaning the inner wall surfaces of an aquarium tank includes a pair of magnetic assemblies adapted for mutual magnetic engagement. Both assemblies include an outer housing of waterproof material, and a planar surface adapted to impinge on the aquarium walls. A scrubber pad is laminated to at least one planar surface of the assemblies, and a strong permanent magnet is secured within the protective enclosure of each housing. One assembly impinges its scrubber surface on the inner surface of an aquarium wall, and the other assembly is disposed directly adjacent to the inner assembly and in magnetic engagement therewith. Translating movement of the outer assembly causes concomitant movement of the inner assembly, whereby the scrubber surface of the inner assembly is translated across the inner surface of the aquarium wall for cleaning purposes. A float is secured by a line or cord to the magnetic assembly disposed within the aquarium. If the inner assembly disengages from the outer assembly, and falls to the bottom of the aquarium, the float will remain at the surface of the water in the aquarium, and the inner assembly may be retrieved by grasping the float and pulling the line and inner assembly from the water. The float permits the inner assembly to be retrieved without requiring any exposure of the hands or clothing to the aquarium water, and with minimal disturbance to the fish within the aquarium.

16 Claims, 3 Drawing Sheets

AQUARIUM WALL CLEANING APPARATUS

BACKGROUND OF THE INVENTION

The present invention relates to aquarium cleaning, and, more particularly, to cleaning devices for removing algae and other foreign matter from the inner surface of the walls of an aquarium.

Aquariums are generally designed to sustain aquatic life in an enclosure that sustains the life forms and presents them in the most attractive and natural manner. Ironically, aquariums require regular care, cleaning, and maintenance to achieve these goals. In particular, aquariums are intended for viewing the aquatic fish and plants, and good viewing requires clean glass or plastic walls. The inner surfaces of the walls typically become coated with a film of algae, dirt, and accumulated scum. Due to several factors, these inner surfaces are the most difficult to clean. Generally, cleaning must be carried out first by removing the fish and other aquatic life and draining the container. This is a major undertaking.

There is known in the prior art a few devices for cleaning the inner surfaces of an aquarium container without draining and removing the life forms therefrom. One device, described in U.S. Pat. No. 3,208,090, provides paired magnetic components, one disposed at the inner surface of the aquarium walls and having a scrubbing surface impinging on the inner surface. The other magnetic component is disposed at the outer surface, directly adjacent to the inner component and in magnetic engagement therewith. Moving the outer component causes the inner component to translate along the inner surface of the glass, whereby the scrubber surface translates across the inner surface to remove algae and scum therefrom.

If the two components disengage magnetically, the inner component falls to the bottom of the aquarium, and necessitates capturing and repositioning the inner component. This can be difficult without disturbing the fish and exposing the aquatic life to unknown toxins and microbes. To overcome this problem, the cited patent describes a string attached to the inner component and adapted to hang over an upper edge of an aquarium. However, a suddenly released inner magnetic component may very likely pull the string into the water as it falls to the bottom of the aquarium, neutralizing the advantage of the string tether.

SUMMARY OF THE INVENTION

The present invention generally comprises an apparatus for cleaning the inner surfaces of an aquarium tank and the like. The apparatus includes a pair of magnetic assemblies, adapted for mutual magnetic engagement. Both of the assemblies include an outer housing of waterproof material, and a planar surface adapted to impinge on the aquarium walls. A scrubber pad or material is laminated to the planar surface of each assembly, and a strong permanent magnet is secured within the protective enclosure of each housing. One assembly is disposed to impinge its scrubber surface on the inner surface of an aquarium wall, and the other assembly is disposed directly adjacent to the inner assembly and in magnetic engagement therewith. Translating movement of the outer assembly causes concomitant movement of the inner assembly, whereby the scrubber surface of the inner assembly is likewise translated across the inner surface of the aquarium wall to remove accumulated algae and dirt therefrom.

A salient feature of the invention is the provision of a float that is secured by a line or cord to the magnetic assembly disposed within the aquarium. The length of the line is sufficient to provide slack for all cleaning movements of the inner assembly on the aquarium wall. If the inner assembly should disengage from the outer assembly, it will fall to the bottom of the aquarium. However, the float will remain at the surface of the water in the aquarium, and the inner assembly may be retrieved by grasping the float and pulling the line and inner assembly from the water. The inner assembly may then be replaced at the inner surface of an aquarium wall. It may be noted that the float permits the inner assembly to be retrieved without requiring any exposure of the hands or clothing to the aquarium water, and with minimal disturbance to the fish within the aquarium.

DESCRIPTION OF THE PREFERRED EMBODIMENT

Figure 1:
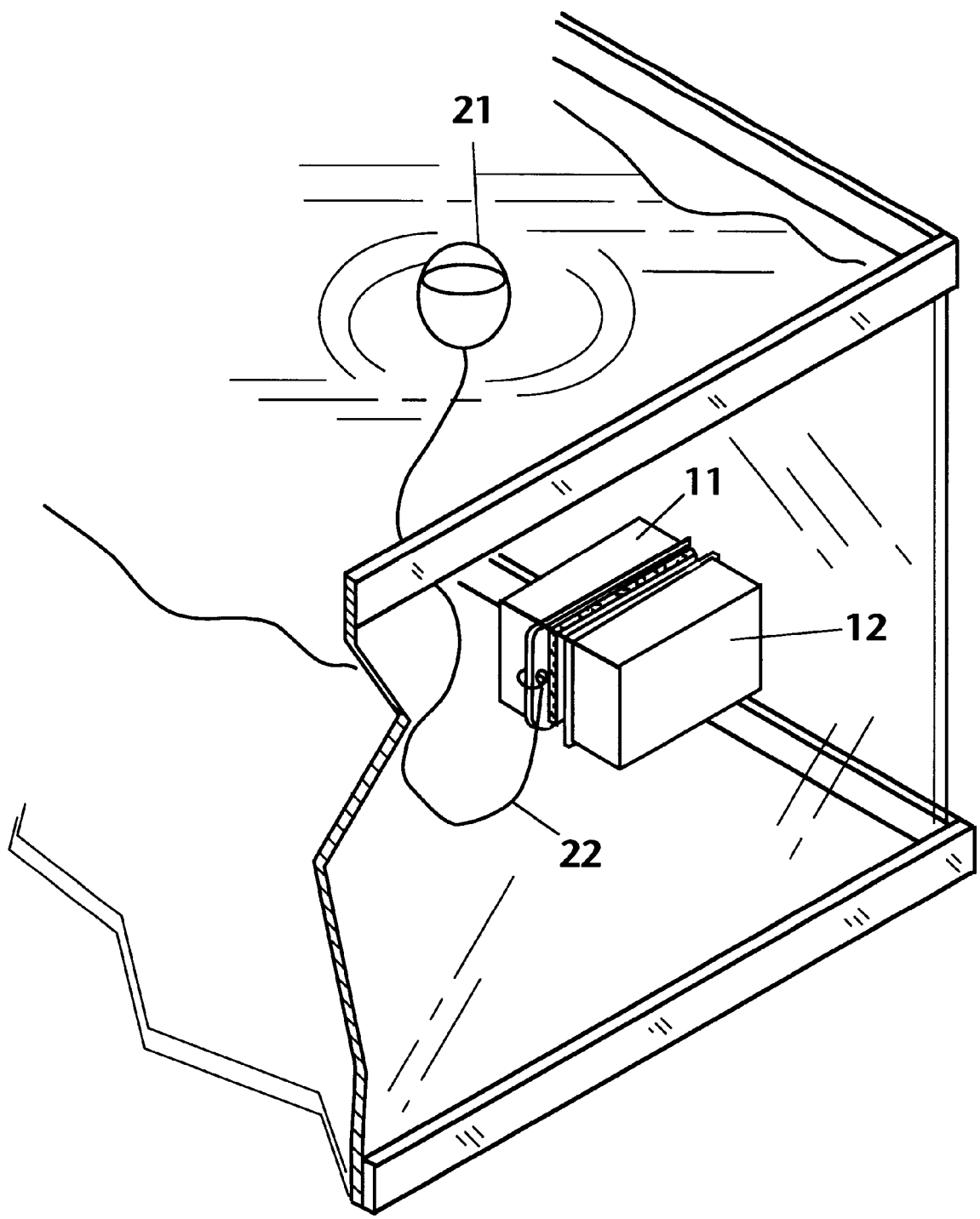
FIG. 1 is a perspective view of the aquarium wall cleaning apparatus of the present invention.

The present invention generally comprises an apparatus for cleaning the inner surfaces of an aquarium tank and the like. With regard to FIGS. 1 and 2, the apparatus generally includes a pair of magnetic assemblies 11 and 12 adapted for mutual magnetic engagement, particularly with a wall of an aquarium interposed therebetween. Both assemblies include outer housings 13 and 14, respectively, enclosing permanent magnets 15 and 16, respectively. The magnets 15 and 16 may be magnetized in any orientation that permits each magnet to assert sufficient attraction mutually to engage and retain the other. Although the housings are depicted as rectangular solid polygons, any shape that is convenient and attractive may be used. Also, the housings 13 and 14 may differ substantially in configuration and appearance without departing from the invention. The housings may be formed of polymer plastic, resin or similar synthetic materials.

The assembly 11 further includes a scrubber pad 17 or like material secured to one surface 31 thereof, the scrubber pad 17 being adapted to impinge on an inner surface 32 of an aquarium wall 33. The assembly 12 includes a surface 31' comparable to the surface 31 of assembly 11, and the surface 31' may or may not includes a scrubber pad. Assembly 12 also includes a flange or tab 18 extending therefrom and provided with a hole 19.

The apparatus further includes a float 21 that is dimensioned and configured to be buoyantly supported at the surface 34 of the water 36 in the aquarium. Although the float is depicted as a simple oblate housing, it may comprise any pleasing and convenient shape. A tether line 22 extends from the float 21 to the hole 19 in the flange 18, where it is tied or otherwise secured. The length of the line 22 is greater that the depth of the water 36, so that the tether line is always accessible through recourse to the float at the surface of the water.

Figure 2:
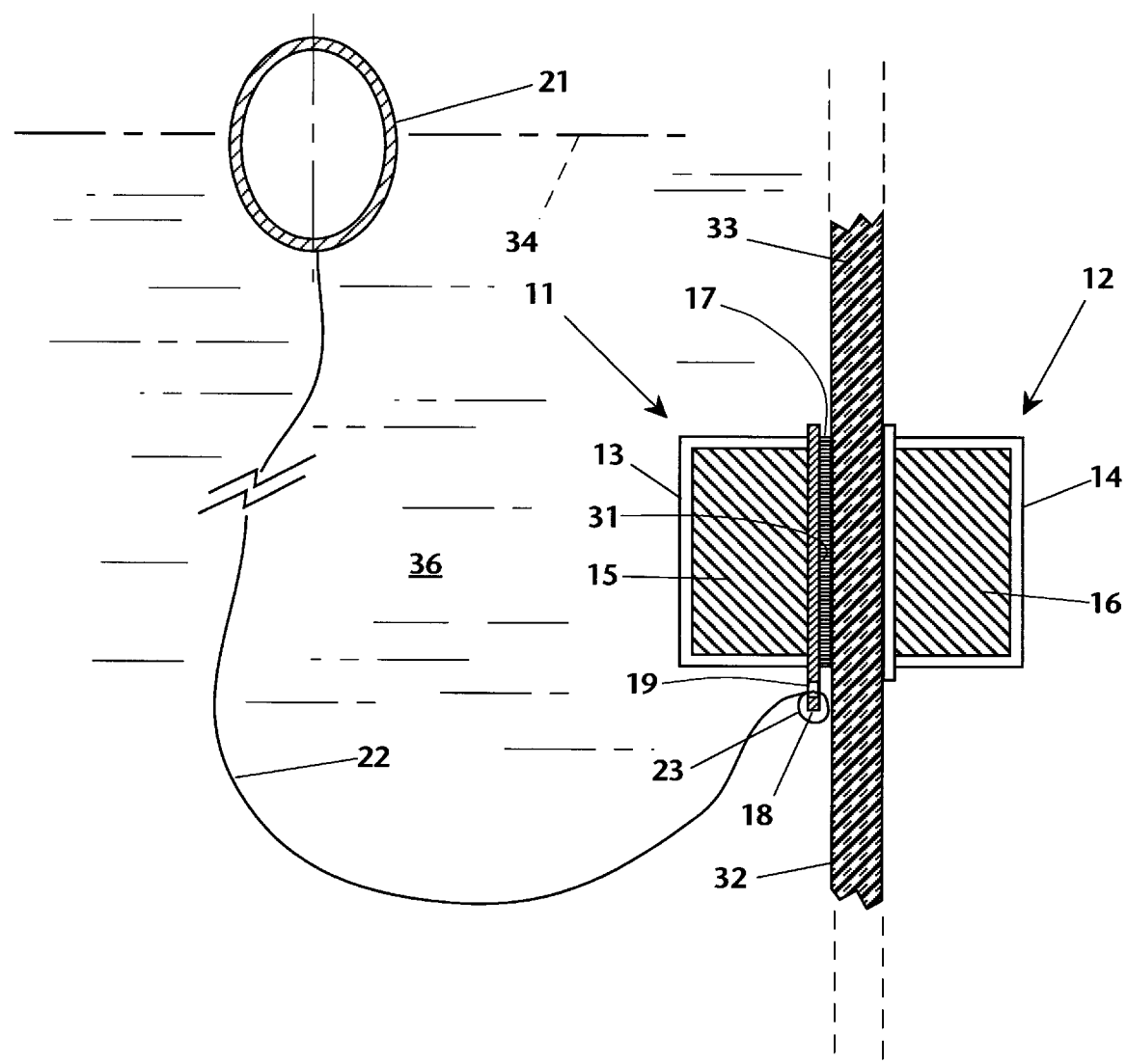
FIG. 2 is a cross-sectional elevation of the aquarium wall cleaning apparatus shown in FIG. 1.

As shown in FIGS. 1 and 2, the assemblies 11 and 12 are placed in enantiomorphic relationship on opposite inner and outer surfaces of an aquarium wall 33, usually a glass or transparent plastic panel. The float 21 is secured by tether line 22 to the assembly 11, and the float 21 is self-supporting at the surface 34 of the water 36. This disposition can be arranged with a minimum of disturbance to the aquatic life in the aquarium, and with minimal exposure of the hands to the water in the aquarium. Thereafter, the outer assembly 12 may be translated along the outer surface of the wall 33, causing assembly 11 to translate in a like manner, with the scrub pad 17 translating along inner surface 32 to loosen and remove algae and other dirt adhering thereto.

Figure 3:
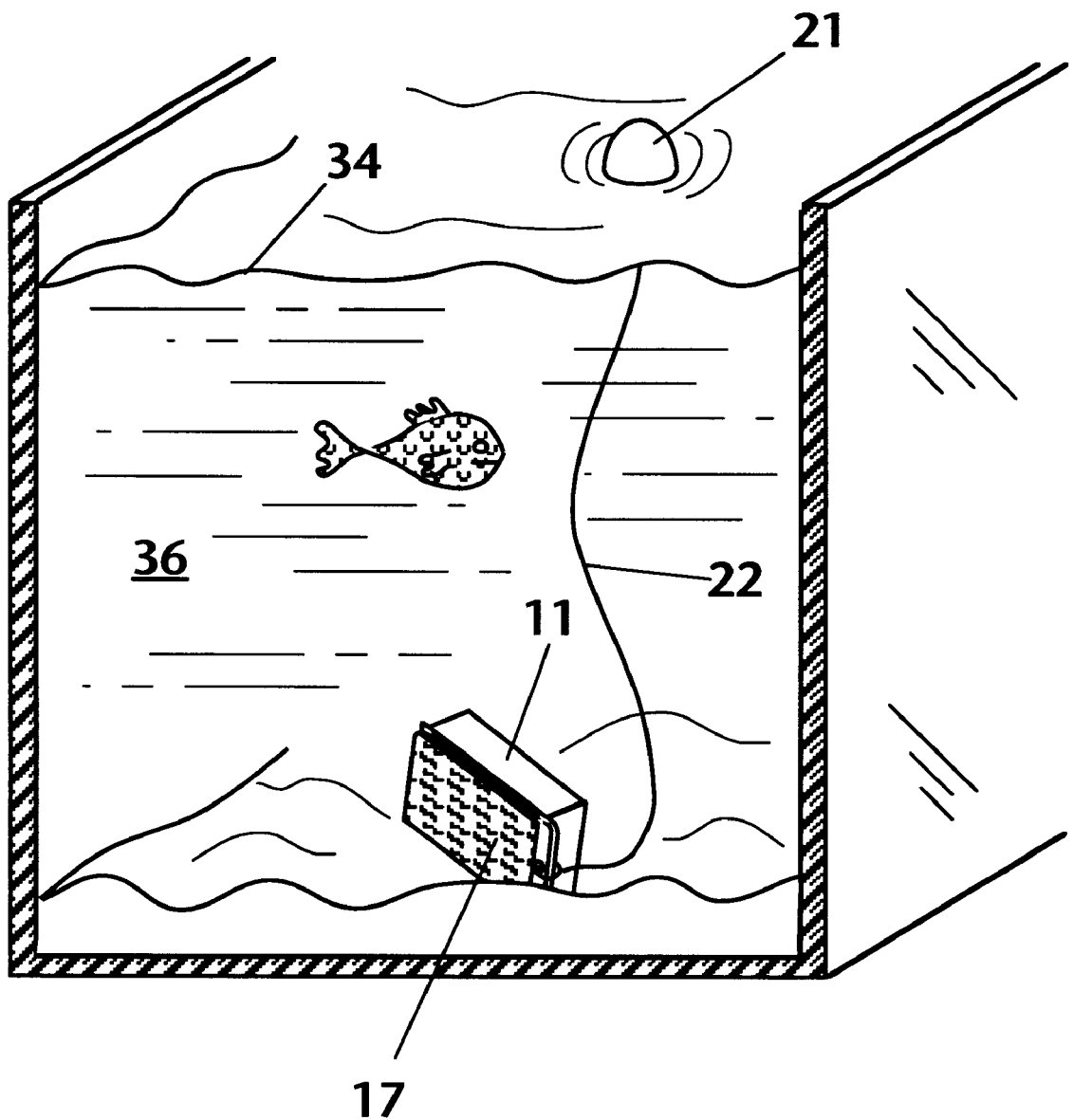
FIG. 3 is a perspective view of the aquarium wall cleaning apparatus, showing the inner assembly dislodged from the wall and connected to the buoyant float.

Occasionally, the magnetic engagement of the two assemblies 11 and 12 may be broken, due to moving the outer assembly 12 to rapidly, obstructions within the aquarium, or the like. As shown in FIG. 3, the inner assembly 11 will then fall to the bottom of the aquarium. To remove the assembly 11 without disturbing the fish or immersing the hands, it is necessary only to grasp and lift the float 21 to gain access to the tether line 22 and use it to retrieve the assembly 11. The two assemblies 11 and 12 may then be restored to their working relationship as shown in FIGS. 1 and 2.

It may be noted that the float may also be used to remove the assembly 11 from the aquarium, even when it remains adhered to a side wall of the aquarium. The use of the tether line minimizes the immersion of the hands in removing the assembly 11 and likewise minimizes the disturbance to the aquatic life in the aquarium.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

I claim:

1. An apparatus for cleaning the walls of an aquarium, including:
   a first magnetic assembly having a first permanent magnet secured therein, said first magnetic assembly adapted to be placed within the aquarium, and including scrubbing means for cleaning the inner surface of a wall of the aquarium;
   a second magnetic assembly having a second permanent magnet secured therein, said second magnetic assembly adapted to be placed outside the aquarium and in close proximity to said first magnetic assembly, whereby said magnetic assemblies may magnetically engage and retain each other to an intervening wall of the aquarium;
   tether means to provide access to said first magnetic assembly, said tether means having one end joined to said first magnetic assembly and a second end; and,
   float means for securing said second end of said tether means, said float means being buoyantly self-supporting in the aquarium.

2. The apparatus of claim 1, wherein said scrubbing means includes a planar surface formed on said first magnetic assembly.

3. The apparatus of claim 2, wherein said scrubbing means further includes a scrubbing pad secured to said planar surface.

4. The apparatus of claim 2, wherein said second magnetic assembly includes a flat surface similar to said planar surface.

5. The apparatus of claim 4, wherein said first and second magnets are polarized to along respective axes in orientations to bring together said planar surface and said flat surface with maximum magnetic attraction.

6. The apparatus of claim 4, further including a scrubber pad secured to said flat surface of said second magnetic assembly.

7. The apparatus of claim 1, wherein said first magnetic assembly includes means for securing said first end of said tether means.

8. The apparatus of claim 7, wherein said means for securing includes a flange extending from said first magnetic assembly, said first end of said tether means being anchored to said flange.

9. The apparatus of claim 1, wherein said tether means is greater in length that the maximum depth of water in the aquarium.

10. The apparatus of claim 1, wherein said float means includes a housing having an oblate spheroid configuration.

11. A device for cleaning the walls of an aquarium, including:
    a magnetic assembly having a permanent magnet secured therein, said magnetic assembly adapted to be placed within the aquarium, and including a scrubbing surface adapted to impinge on and clean the inner surface of a wall of the aquarium;
    means for attracting said magnetic assembly to a wall of the aquarium with said scrubbing surface impinging on the inner surface of the wall;
    tether means to provide access to said magnetic assembly, said tether means having one end joined to said magnetic assembly and a second end; and,
    float means for securing said second end of said tether means, said float means being buoyantly self-supporting in the aquarium.

12. The apparatus of claim 11, wherein said scrubbing surface includes a planar surface formed on said magnetic assembly.

13. The apparatus of claim 11, wherein said magnetic assembly includes means for securing said first end of said tether means.

14. The apparatus of claim 13, wherein said means for securing includes a flange extending from said magnetic assembly, said first end of said tether means being anchored to said flange.

15. The apparatus of claim 11, wherein said tether means is greater in length that the maximum depth of water in the aquarium.

16. The apparatus of claim 11, wherein said float means includes a housing having an oblate spheroid configuration.

* * * * *